(12) United States Patent
Kraska et al.

(10) Patent No.: US 8,192,324 B2
(45) Date of Patent: Jun. 5, 2012

(54) VEHICLE AND METHOD FOR CONTROLLING ENGINE START IN A VEHICLE

(75) Inventors: Marvin Paul Kraska, Dearborn, MI (US); Walter Joseph Ortmann, Saline, MI (US); Brandon R. Masterson, Dexter, MI (US); Daniel Scott Colvin, Farmington Hills, MI (US); Francis T. Connolly, Ann Arbor, MI (US); Andrew John Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 12/617,896

(22) Filed: Nov. 13, 2009

(65) Prior Publication Data

US 2011/0118078 A1    May 19, 2011

(51) Int. Cl.
*B60W 10/08* (2006.01)
(52) U.S. Cl. ............................................. 477/5
(58) Field of Classification Search ............ 477/5
See application file for complete search history.

(56) References Cited

U.S. PATENT DOCUMENTS

| | | | |
|---|---|---|---|
| 4,335,429 A | 6/1982 | Kawakatsu | |
| 5,343,970 A | 9/1994 | Severinsky | |
| 5,681,242 A | 10/1997 | Bates | |
| 5,916,061 A | 6/1999 | Koyama et al. | |
| 6,018,198 A * | 1/2000 | Tsuzuki et al. | 290/17 |
| 6,077,186 A | 6/2000 | Kojima et al. | |
| 6,176,807 B1 | 1/2001 | Oba et al. | |
| 6,176,808 B1 | 1/2001 | Brown et al. | |
| 6,253,127 B1 * | 6/2001 | Itoyama et al. | 701/22 |
| 6,342,027 B1 * | 1/2002 | Suzuki | 477/5 |
| 6,364,807 B1 * | 4/2002 | Koneda et al. | 477/5 |
| 6,524,219 B2 | 2/2003 | Mesiti et al. | |
| 6,581,705 B2 | 6/2003 | Phillips et al. | |

(Continued)

FOREIGN PATENT DOCUMENTS

GB    2413998 A1    11/2005

(Continued)

OTHER PUBLICATIONS

Colvin Dan, et al., Challenges of Engine Starts and Drivability in a Parallel Hybrid-Electric System, SAE Technical Paper Series 2004-01-0063, Mar. 8-11, 2004, pp. 1-12.

(Continued)

*Primary Examiner* — Dirk Wright
(74) *Attorney, Agent, or Firm* — David B. Kelley; Brooks Kushman P.C.

(57) ABSTRACT

A vehicle includes a motor/generator, a starter motor, a disconnect clutch disposed between the engine and the motor/generator, and at least one clutch disposed between the motor/generator and the vehicle drive wheels. When an engine start is requested, various parameters are controlled to ensure a smooth engine start wherein driveline torque disturbances are minimized. The starter motor is used to crank the engine at the lowest engine speeds when the engine-required torque is the highest. This reduces the amount of torque necessary to be supplied from the motor/generator, and further helps to reduce torque disturbances in the driveline. If the motor/generator is producing torque to propel the vehicle at the time the engine start is requested, a launch clutch or one or more transmission clutches can be controlled to provide slip between the motor/generator and the vehicle drive wheels to further reduce torque disturbances in the driveline.

20 Claims, 5 Drawing Sheets

U.S. PATENT DOCUMENTS

| | | |
|---|---|---|
| 6,585,066 B1 | 7/2003 | Koneda et al. |
| 6,602,164 B2 | 8/2003 | Yoshiaki et al. |
| 6,655,485 B1 * | 12/2003 | Ito et al. ............. 180/65.6 |
| 6,722,230 B2 | 4/2004 | Sakamoto et al. |
| 6,823,954 B2 | 11/2004 | Shimabukuro et al. |
| 6,962,224 B2 | 11/2005 | Nakanowatari |
| 7,207,404 B2 * | 4/2007 | Ito et al. ............. 180/65.28 |
| 7,351,182 B2 | 4/2008 | Kobayashi |
| 7,370,715 B2 | 5/2008 | Colvin et al. |
| 7,770,678 B2 * | 8/2010 | Nozaki et al. ............. 180/65.6 |
| 2001/0005805 A1 | 6/2001 | Saotome et al. |
| 2002/0063002 A1 | 5/2002 | Lasson |
| 2002/0179047 A1 | 12/2002 | Hoang et al. |
| 2005/0121239 A1 | 6/2005 | Tsuneyoshi et al. |
| 2007/0102211 A1 | 5/2007 | Nozaki et al. |
| 2007/0259755 A1 | 11/2007 | Tanishima |
| 2008/0119975 A1 | 5/2008 | Yamazaki et al. |
| 2009/0171538 A1 | 7/2009 | Kadota |

FOREIGN PATENT DOCUMENTS

| | | |
|---|---|---|
| JP | 2000115911 A | 4/2000 |
| JP | 2000125414 A | 4/2000 |
| JP | 2000255285 A | 9/2000 |
| JP | 2001263209 A | 9/2001 |
| JP | 2002309982 A | 10/2002 |
| JP | 200554858 A | 3/2005 |
| JP | 2006306210 A | 11/2006 |
| JP | 2007069790 A | 3/2007 |
| WO | 03086804 A1 | 10/2003 |
| WO | 2007102776 A1 | 9/2007 |

OTHER PUBLICATIONS

Office Action of Japanese Serial No. 2005-378163 dated Mar. 17, 2009, pp. 1-3.

http://www.Volkswagenag.com/vwag/vwcorp/info_center/en/news/2007/09/more_drivability_fewer_emissions.html, pp. 1-6.

Japanese Office Action dated Jan. 12, 2010 pp. 1-3.

* cited by examiner

VEHICLE AND METHOD FOR CONTROLLING ENGINE START IN A VEHICLE

BACKGROUND OF THE INVENTION

1. Field of the Invention

The present invention relates to a vehicle and a method for controlling engine start in a vehicle.

2. Background Art

Hybrid electric vehicles (HEV's) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or if the battery state of charge (SOC) drops below a certain level, the engine must start quickly and smoothly in a manner that is nearly transparent to the driver.

One method of controlling engine start in an HEV is described in U.S. Pat. No. 7,370,715 issued to Colvin et al. on 13 May 2008, which is hereby incorporated herein by reference. In an HEV, the engine may be initially cranked by an electric motor that may also output torque to propel the vehicle. When the vehicle is being propelled by the motor, and an engine start is requested, it is desirable to control the powertrain—i.e., the engine, motor, transmission, etc.—such that torque is transferred from the motor to the engine without substantially disrupting the flow of torque from the motor to the vehicle wheels. This can be particularly problematic when the engine is first being cranked because this is when the engine torque requirements are highest and torque disturbances can occur. Therefore, a need exists for a vehicle, and a method for controlling engine start in a vehicle, that reduces or eliminates driveline torque disturbances when the engine is started.

SUMMARY OF THE INVENTION

Embodiments of the present invention include a vehicle having an engine, an electric machine that can output torque to the engine and to the vehicle wheels, and a starter motor operatively connected to the engine. The electric machine and starter motor can both be used to provide torque to start the engine, and they can be controlled in such a way that driveline torque disturbances are reduced or eliminated.

In some embodiments, a method of the present invention may be employed when the vehicle is moving at a relatively steady speed. In such a case, a disconnect clutch disposed between the electric machine and the engine can be initially engaged using a solenoid, for example, a variable force solenoid, operated by the electric machine. The initial engagement of the disconnect clutch can be a "rapid fill" characterized by an initial high pressure increase, which brings the disconnect clutch pressure to a first level.

The pressure in the disconnect clutch can then be reduced to what is commonly referred to as a "stroke pressure". The stroke pressure is the amount of pressure necessary to move a clutch piston or the clutch plates to just at the point of contact. At the stroke pressure, the clutch is slipping, but it is ready to be quickly engaged.

Although the operation of the clutch described above uses the term "pressure", thereby implying a hydraulic clutch, other types of clutches, such as electromechanical clutches may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches described herein will be in terms of "pressure", though it is understood it includes situations where a non-hydraulic force is applied to the clutch plates in a non-hydraulic clutch.

In order to reduce the required torque transfer from the electric machine to the engine during the engine start, the starter motor is operated substantially simultaneously with the start of the initial fill of the disconnect clutch. This allows the engine to be substantially or completely cranked with the starter motor at the time when the starting torque requirements of the engine are highest. The pressure level of the disconnect clutch can then be raised to facilitate torque transfer from the electric machine to the engine, and when the engine speed is a predetermined speed above the speed of the starter motor, the starter motor can be turned off.

In order to isolate the vehicle wheels from disturbances that may occur during the transfer of torque from the electric machine to the engine, one or more clutches disposed between the electric machine and the vehicle wheels can be caused to slip. In the situation described above, where the vehicle is operating at substantially steady speed when the engine start is requested, a launch clutch may be controlled to provide a certain amount of slip between the electric machine and the vehicle wheels. Embodiments of the present invention do, however, also contemplate starting the engine at a time when a downshift in a transmission gear has been requested. In such a situation, there will be one or more transmission clutches that are being released from engagement, and one or more transmission clutches that are in the process of being engaged. These oncoming and offgoing clutches are typically controlled in accordance with a production shift schedule programmed into a control system having a controller, such as a transmission control module (TCM). When the engine start is requested during a downshift, the oncoming and offgoing clutches can be controlled according to the production shift schedule, or some other shift schedule, such that slip occurs between the electric machine and the vehicle drive wheels, thereby isolating the drive wheels from torque disturbances as the engine is started.

Embodiments of the invention also include a method for starting an engine in a vehicle having a starter motor for rotating the engine to facilitate an engine start, an electric machine, a disconnect clutch disposed between the engine and the electric machine for selectively connecting the engine to the electric machine, and at least one other clutch disposed between the electric machine and the vehicle drive wheels. The at least one other clutch may be, for example, a launch clutch such as described above, or one or more transmission clutches that are controlled according to a shift schedule. In at least some embodiments, the engine start will be requested when the disconnect clutch is at least substantially disengaged. Although it is contemplated that the disconnect clutch may be completely disengaged, it is understood that the term "at least substantially disengaged" contemplates those situations where there may be a small engagement of the disconnect clutch, where only a negligible amount of torque is transferred between the electric machine and the engine.

After the engine start is requested, the electric machine is operated, and the disconnect clutch is engaged from the at least substantially disengaged state with an initial fill to bring a pressure of the disconnect clutch to a first level. As discussed above, the initial fill may be a rapid fill with an initial high pressure, or a solenoid/clutch system may be used that rapidly engages the clutch without the high pressure associated with a conventional "rapid fill". Operation of the starter motor is initiated substantially simultaneously with the start of the initial fill of the disconnect clutch. This provides torque transfer from the starter motor to the engine and reduces the amount of torque transfer necessary from the electric machine to the engine. The starter motor is turned off, the engine is fueled, and the disconnect clutch is fully engaged. Engine start is now complete.

Embodiments of the present invention also include a vehicle having an engine, a starter motor for rotating the engine to facilitate an engine start, an electric machine operable to propel the vehicle and to rotate the engine, and a first clutch disposed between the engine and the electric machine for selectively connecting the engine to the electric machine. The first clutch may be, for example, a disconnect clutch as described above. The vehicle also includes a control system that has at least one controller, for example, a TCM as described above. The control system may further include additional controllers, such as an engine control unit (ECU), a vehicle system controller (VSC), and a powertrain control module (PCM), each of which may be connected to the TCM through a network such as a controller area network (CAN). The control system may be configured to perform an engine start such as described above, wherein the starter motor is controlled to crank the engine during the time of highest engine torque demand, for example, up to approximately 100 revolutions per minute (rpm). The control system can also control an amount of slip between the electric machine and the vehicle wheels as the engine is being started. Some torque can then be transferred from the electric machine to the engine and the starter motor shut off.

DETAILED DESCRIPTION OF EMBODIMENTS OF THE INVENTION

Figure 1:
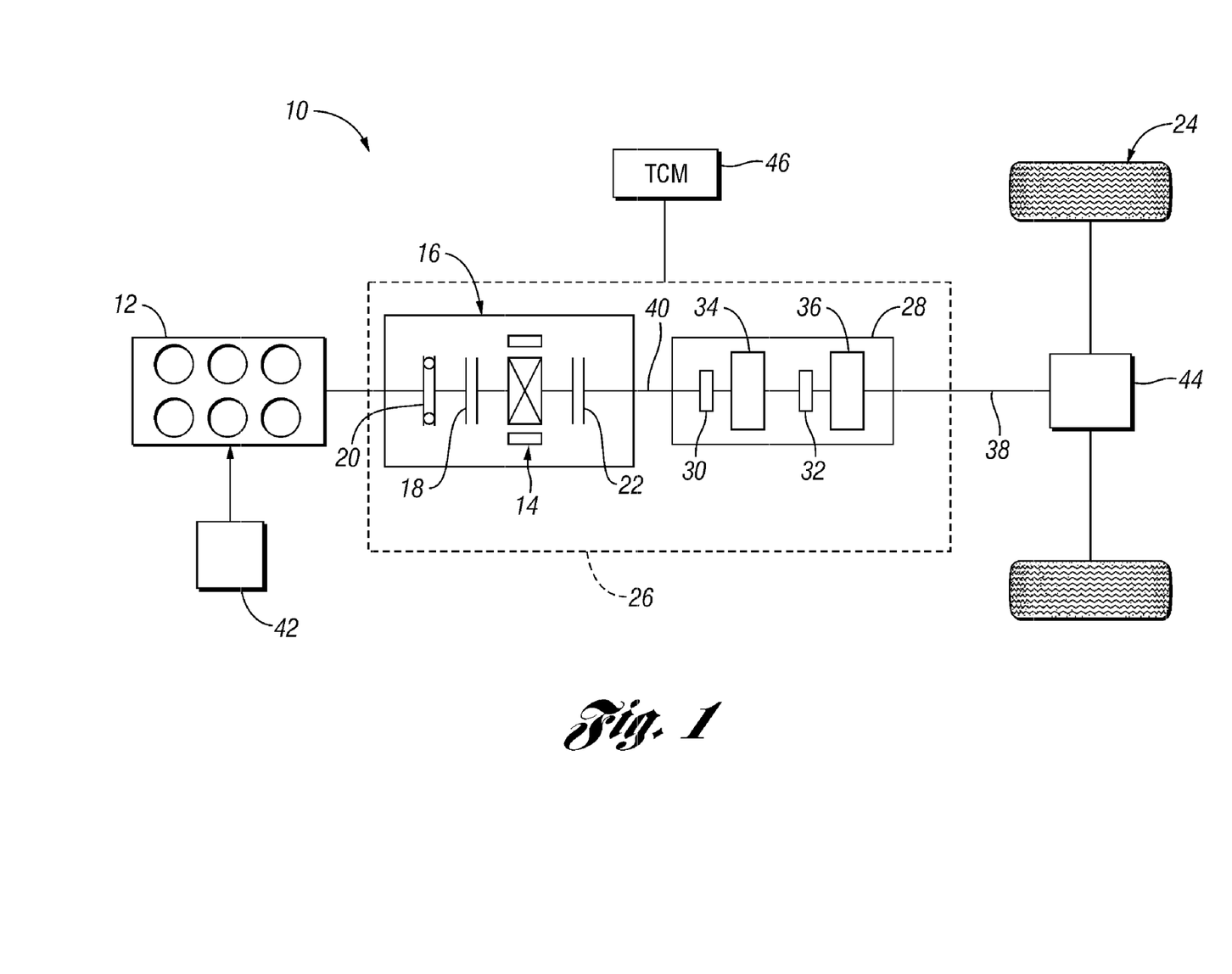
FIG. 1 is a schematic diagram of a vehicle in accordance with the present invention.

FIG. 1 shows a schematic diagram of the vehicle 10 in accordance with the present invention. The vehicle 10 is an HEV, and includes an engine 12, and an electric machine, or motor/generator (M/G) 14. The M/G 14 is part of a clutch/motor housing 16 that further includes a first clutch 18, or disconnect clutch and a damper 20 disposed between the disconnect clutch 18 and the engine 12. The damper 20 may be, for example, a series of plates and springs configured to help dampen changes in torque transferred between the engine 12 and the M/G 14 when the disconnect clutch 18 is being engaged. The clutch/motor housing 16 also includes a launch clutch 22, which, as described in more detail below, can be controlled to isolate the M/G 14 from vehicle drive wheels 24.

The clutch/motor housing 16 is part of a transmission 26 that also includes a gear box 28. Like the rest of FIG. 1, the gear box 28 is illustrated as a simple schematic figure to reduce unnecessary complexity in the drawing figure. The gear box 28 includes two transmission clutches 30, 32 and two planetary gear sets 34, 36. It is understood that other gear box configurations can be used in a vehicle, such as the vehicle 10, and in methods contemplated by the present invention. As described in more detail below, the clutches 30, 32 can be controlled through a shift schedule, such as a production shift schedule, that connects and disconnects certain elements of the planetary gear sets 34, 36 to control the ratio between a transmission output 38 and a transmission input 40.

The vehicle 10 also includes a starter motor 42 operatively connected to the engine 12, for example, through a belt or gear drive. A differential 44 is disposed between the transmission output 38 and the vehicle drive wheels 24. In addition, the vehicle 10 includes a control system, which, in the embodiment shown in FIG. 1, is a TCM 46. As described above, a control system for a vehicle, such as the vehicle 10, can include any number of controllers, some or all of which may be connected through a CAN or other communication system. As described in detail below, the TCM 46 can be configured to control operation of the various components of the transmission 26 in conjunction with the operation of the starter motor 42 and the engine 12, such that the engine 12 can be started under any of a number of different conditions in a way that minimizes torque disturbances and impact on the driver.

Figure 2:
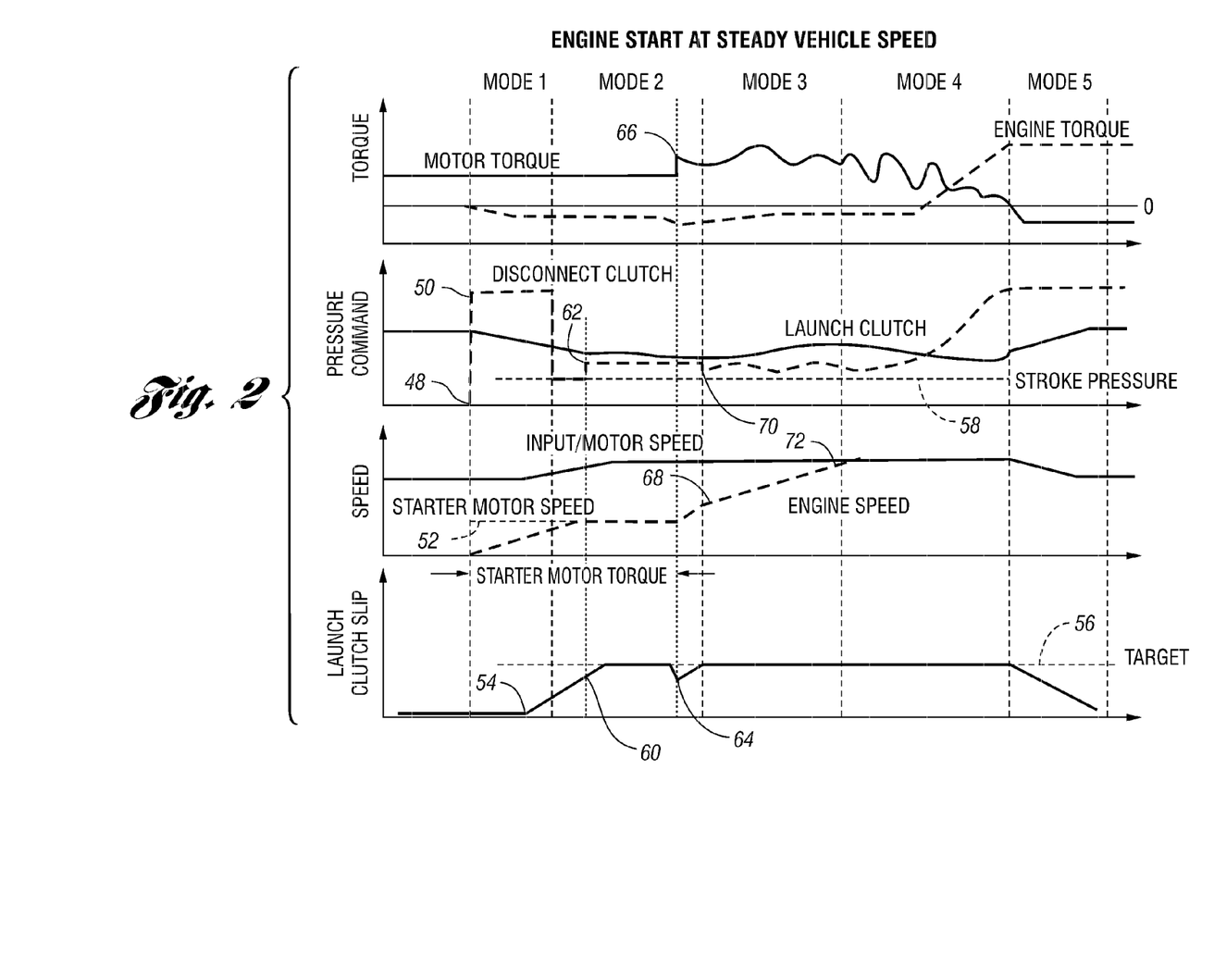
FIG. 2 is a graph illustrating how various parameters of the vehicle shown in FIG. 1 change over time during an engine start at steady vehicle speed.

Four different engine start modes are now described in detail using FIGS. 2-5 with reference to the vehicle 10 shown in FIG. 1. FIG. 2 shows a diagram of a method for engine start in accordance with embodiments of the present invention, when the vehicle 10 is operating at substantially steady speed. Of course, the vehicle speed can be changing somewhat, but it is contemplated that no transmission downshifts will occur during the engine start routine for the situation illustrated in FIG. 2. As shown in FIG. 2, the engine start is requested at the start of Mode 1. Illustrated at point 48 is the pressure of the disconnect clutch 18 when the engine start is requested. At point 48, the pressure in the disconnect clutch 18 is essentially zero—i.e., the disconnect clutch 18 is completely or substantially disengaged. In Mode 1, the disconnect clutch pressure is raised to a first level by a rapid fill to a level indicated at point 50. As described above, control of the disconnect clutch 18 can be effected by the TCM 46, and although the initial fill is a "rapid fill", it does not need to be.

Also at the start of Mode 1, substantially simultaneously with the rapid fill of the disconnect clutch 18, the starter motor 42 is initiated to start cranking the engine 12—see point 52 on FIG. 2. Also during Mode 1, the launch clutch 22 is controlled to start slipping at point 54 with the goal of reaching a target slip speed 56. During Mode 1, the M/G 14 (referred to a "motor" in FIGS. 2-5) is controlled such that its output torque is essentially steady to continue to drive the vehicle, and it is controlled by the TCM 46 using torque control. Torque control is a method of controlling a torque-producing device such that the output speed of the device is allowed to vary while the output torque is controlled to a desired level. At the end of Mode 1, the pressure in the disconnect clutch 18 is reduced to a second level to the stroke pressure 58, where little or no torque is transferred between the M/G 14 and the engine 12. It is worth noting that even though the pressure command in the disconnect clutch 18 is relatively high when the rapid fill takes place in Mode 1, the actual pressure is small and little or no torque will be transferred between the M/G 14 and the engine 12 during Mode 1.

In Mode 2, the disconnect clutch 18 will remain at the stroke pressure 58 until a calibratable launch clutch slip speed is detected—this is shown at point 60 on FIG. 2. The amount of slip at point 60 is determined to be enough to reduce driveline disturbances when torque is transferred from the M/G 14 to the engine 12. Therefore, when point 60 is reached, the pressure in the disconnect clutch 18 is raised to a third level shown by point 62 in FIG. 2. This amount of increase to the third pressure level is a calibratable amount above the stroke pressure 58. Although in this embodiment the pressure is raised to the third level when a certain amount of clutch slip is detected, it can also be raised based on other parameters, for example, an amount of time the disconnect clutch pressure has been at the stroke pressure.

The launch clutch 22 is controlled until it reaches the target slip speed 56, at which time it is controlled according to a closed loop controller, such as a PID controller, such that it remains at or near the target slip speed 56. The M/G 14 continues to be controlled using torque control until a change in the slip speed of the launch clutch 22 is detected. At point 64, the launch clutch slip speed dips, indicating that the disconnect clutch 18 has capacity. Here, the engine torque has gone slightly more negative, and therefore the torque of the M/G 14 is increased slightly by a calibratable amount to provide the additional torque being used by the engine 12—see point 66 on the motor torque curve.

Also during Mode 2, the engine 12 continues to be cranked using the starter motor 42. At some point, the engine speed begins to increase beyond the speed of the starter motor 42, which is a result of the increased torque provided by the M/G 14. After the engine speed increases beyond that of the starter motor speed, the starter motor 42 ceases to provide torque to the engine 12. After the engine speed has reached a calibratable level above the starter motor speed—see point 68—the starter motor is shut off and Mode 2 is ended. At the start of Mode 3, the pressure in the disconnect clutch 18 is reduced to a level indicated by point 70, and then it is controlled using closed loop control—e.g., with a PID controller—to try to maintain a relatively constant pressure. The slip in the launch clutch 22 continues to be controlled using the closed loop pressure control to maintain an approximately constant slip. The M/G 14 is now placed in speed control to maintain acceleration of the vehicle 10 at its then current level. During speed control, the amount of torque output by the M/G 14 is allowed to vary, while the speed is controlled to be essentially constant, or at the demanded level if the driver demand changes.

Mode 4 begins when the speed of the engine 12 is within a calibratable level below the speed of the M/G 14—see point 72. During Mode 4, the engine 12 is placed in torque control based on a driver demand for torque. The M/G 14 is maintained in speed control, and the engine 12 is fueled to initiate combustion. When the torque of the M/G 14 consistently drops to zero or below, Mode 4 is ended, and the final engine start routines are performed. By "consistently drops to zero or below," it is meant that the torque of the M/G 14 has not anomalously hit zero or is not determined to be zero because of a noisy signal.

In Mode 5, the pressure and the disconnect clutch 18 is raised to a maximum, and the pressure in the launch clutch 22 is smoothly raised until it is locked. The engine 12 continues to be controlled using torque control based on driver-demanded torque, and the M/G 14 can be used as a generator based on the needs of the battery or other electrical energy requirements of the vehicle 10. When the launch clutch 22 is no longer slipping, Mode 5 is exited and the engine start routine is complete.

Figure 3:
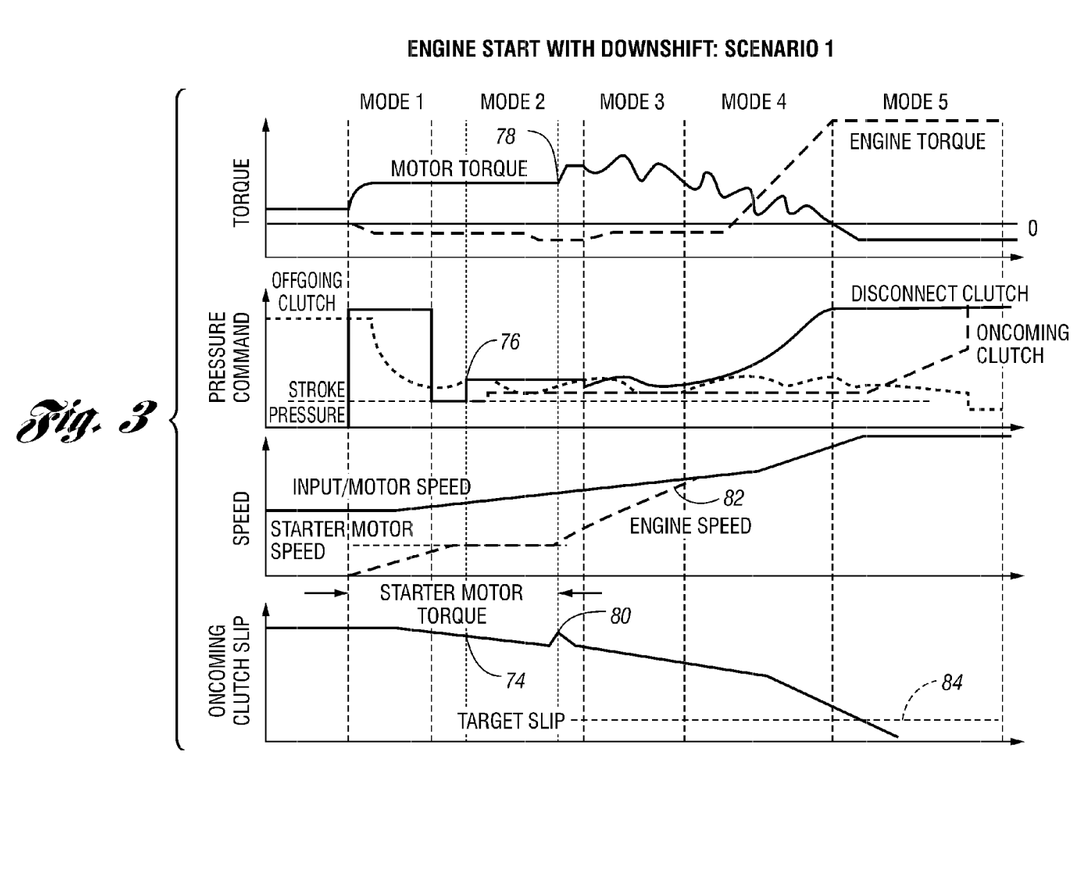
FIG. 3 is a graph illustrating how various parameters of the vehicle shown in FIG. 1 change over time when an engine start is requested during a downshift under one scenario.

FIG. 3 shows various vehicle parameters during an engine start where a transmission downshift occurs during the engine start routine. During the engine start illustrated in FIG. 3, it is contemplated that the engine will be engaged before the downshift completes; hence, FIG. 3 is further labeled "Scenario 1" to distinguish it from FIG. 4—Scenario 2—where it is contemplated that the downshift has begun before the engine start is requested, and therefore, the downshift is complete or nearly complete before the engine is engaged. Returning to FIG. 3, it is shown that the pressure profile of the disconnect clutch is similar to the profile used in FIG. 2. The disconnect clutch 18 is initially filled at the beginning of Mode 1, and the starter motor 42 is operated substantially simultaneously with the initial fill of the disconnect clutch 18.

One notable difference between the engine start at steady state and the engine start with downshift, is that it is not the launch clutch 22 that is controlled to slip to isolate torque disturbances from the driveline; rather, it is the transmission clutches 30, 32—one of which is an oncoming clutch, the other of which is offgoing clutch—that are controlled to provide slip between the M/G 14 and the vehicle drive wheels 24. The pressure profiles for the oncoming clutch and the offgoing clutch are shown the adjacent the pressure profile for the disconnect clutch, and the slip of the oncoming clutch is shown at the bottom of FIG. 3. Throughout Mode 1, the M/G 14 is controlled by torque control and at the end of the initial fill of the disconnect clutch 18, Mode 1 is ended.

At the start of Mode 2, the pressure in the disconnect clutch is reduced to a second level, which is the stroke pressure as described above. The disconnect clutch is operated at the stroke pressure until a calibratable level of slip is detected in the oncoming clutch—this is shown at point 74 in FIG. 3. At this point, the pressure in the disconnect clutch is increased by a calibratable amount to a third level indicated at point 76. In the embodiment shown in FIG. 3, the pressure in the oncoming and offgoing clutches 30, 32 is controlled according to a production shift schedule. This is a shift schedule preprogrammed into the TCM 46 and is used to control operation of the clutches 30, 32 during various upshifts and downshifts. If desired, a different shift schedule could be used during the engine start routine when a downshift occurs. As before, Mode 2 is ended, and the starter motor 42 shut off, when the speed of the engine 12 is a calibratable amount above the speed of the starter motor 42. In other embodiments, the starter motor 42 can be shut off based on other vehicle conditions, for example, an absolute value of engine speed, rather than a relative speed of the engine 12 compared to the starter motor 42, a certain level of engine torque, or some other parameter. It is worth noting that the motor torque is increased during Mode 2 when a spike in the slip speed of the oncoming clutch is detected—see points 78, 80 in FIG. 3.

In Mode 3, the pressure of the disconnect clutch is reduced and it is controlled according to a closed-loop pressure control that tries to maintain an approximately constant clutch pressure. The M/G 14 is placed in speed control in Mode 3, and it is controlled to maintain a then-current level of vehicle acceleration. Mode 3 is exited when the speed of the engine 12 is a certain calibratable level below the speed of the M/G 14—this is shown at point 82 in FIG. 3. In Mode 4, the slip of the oncoming clutch is examined; if it is greater than a target slip 84, then it continues to be controlled according to the shift schedule in use. If it reaches the target slip in Mode 4, it is maintained at the target slip level using closed-loop control. During Mode 4, fuel is provided to the engine 12, and it is placed in torque control and operated based on driver-demanded torque. When the torque of the M/G 14 consistently drops to zero or below, thereby indicating that the engine torque is able to maintain the vehicle speed, Mode 4 is ended.

During Mode 5, the disconnect clutch pressure is brought to a maximum and control of the engine is maintained in torque control based on the torque demanded by the driver. Just as in Mode 4, the slip of the oncoming clutch is examined, and if it is above the target slip 84, control of the oncoming and offgoing clutches is maintained according to the shift schedule. Also during Mode 5, the M/G 14 can be placed in generator control depending on the battery charge or other electrical requirements, or the performance needs, of the vehicle 10. Mode 5 and the engine start routine is complete when the oncoming and offgoing clutches have completed their transition according to the shift schedule.

Figure 4:
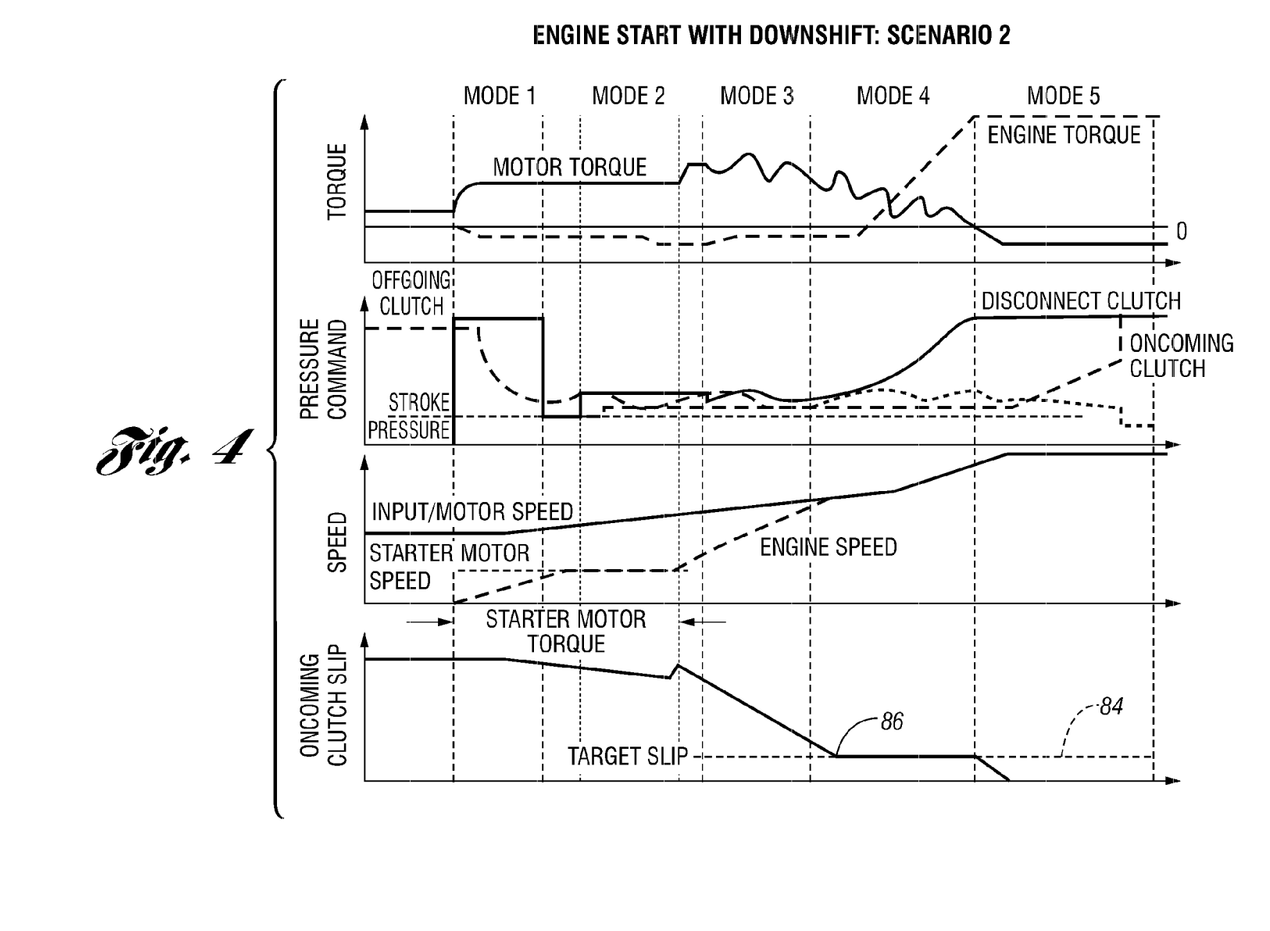
FIG. 4 is a graph illustrating how various parameters of the vehicle shown in FIG. 1 change over time when an engine start is requested during a downshift under a second scenario.

As noted above, FIG. 4 illustrates a second scenario in which an engine start is requested during a downshift event. In FIG. 4, the downshift has begun prior to the request of engine start, and is therefore very nearly complete before the engine 12 is engaged. The description for Modes 1-3 used for FIG. 3 are equally applicable to the engine start routine illustrated in FIG. 4. In Mode 4, however, FIG. 4 differs markedly from the engine start routine illustrated in FIG. 3. As shown in FIG. 4, the slip of the oncoming transmission clutch reaches the target slip 84' early on in Mode 4—this is shown at point 86. Throughout the rest of Mode 4, the slip of the oncoming clutch is no longer controlled according to the shift schedule; rather, its slip is maintained at the target slip level 84'. During Mode 5, the disconnect clutch 18 is brought to maximum pressure, and the operation of the oncoming and offgoing transmission clutches 30, 32 is completed; this ends Mode 5 and the engine start routine shown in FIG. 4.

Figure 5:
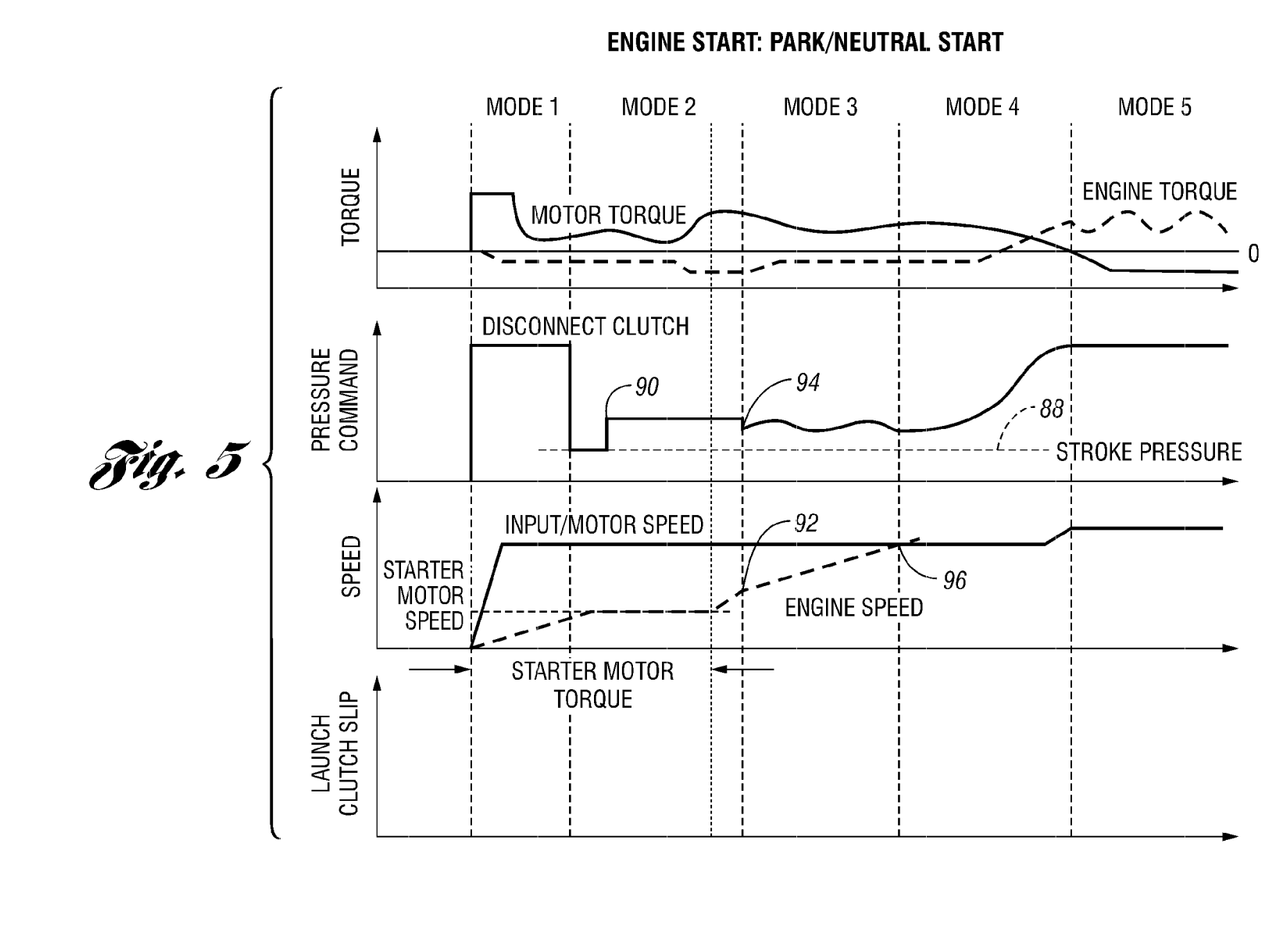
FIG. 5 is a graph illustrating how various parameters of the vehicle shown in FIG. 1 change over time when an engine start is requested and the vehicle is at rest.

FIG. 5 illustrates an engine start different from any of the other three engine start routines described above. In FIG. 5, it is contemplated that the vehicle is not moving during the engine start request. Thus, the vehicle 10 is in a park or neutral gear, and the engine start request may come not from a driver demand for increased power, but rather from the vehicle being started by the driver via a "key start". Like the other engine start routines described above, Mode 1 begins with the disconnect clutch 18 undergoing an initial fill, during which time the starter motor 42 is engaged substantially simultaneously with the initial fill of the disconnect clutch 18.

Unlike the other engine start routines described above, the M/G 14 is initially placed in a speed control, where it is held at a calibratable speed level below the desired engine idle speed. Another difference between a key start and other engine start routines is that an auxiliary electric pump may be used to provide the initial fill requirements of the disconnect clutch 18. If the M/G 14 is operating when the engine start is requested—such as illustrated in FIGS. 2-4—the M/G 14 can operate a primary hydraulic pump. With the key start, however, the M/G 14 is not operating and an auxiliary electric pump can be used. At the end of the initial fill of the disconnect clutch 18, Mode 1 is ended and Mode 2 begins.

The pressure of the disconnect clutch 18 is reduced to a second level, which is the level of the stroke pressure 88. At point 90, the pressure of the disconnect clutch 18 is increased by a calibratable level such that torque can be transferred from the M/G 14 to the engine 12. This increase to the third pressure level may be based on, for example, an amount of time the disconnect clutch 18 has been at the stroke pressure. At point 92, the speed of the engine 12 is above the speed of the starter motor 42 by some calibratable amount, Mode 2 is ended, and the starter motor 42 is shut off. As noted above, other parameters may be used to determine when to shut off the starter motor 42 and enter Mode 3. At point 94 in Mode 3, the pressure of the disconnect clutch 18 is reduced by a calibratable amount and the pressure is then controlled according to a closed-loop pressure control, for example, with a PID controller, to try to maintain an approximately consistent level of pressure. The M/G 14 continues to be controlled according to speed control, and Mode 3 is ended at point 96, when the speed of the engine 12 is a calibratable amount below the speed of the M/G 14.

In Mode 4, the pressure of the disconnect clutch 18 is increased toward its maximum pressure, fuel is supplied to the engine 12, which is then placed in torque control based on a driver demand for torque. Mode 4 is exited when the torque of the M/G 14 consistently drops below the torque output by the engine 12, indicating that the engine torque is able to maintain the vehicle speed. In Mode 5, the pressure of the disconnect clutch 18 is brought to a maximum, the engine is controlled at an idle speed based on idle speed control parameters, which may be a pre-programmed production idle speed control maintained by an ECU (not shown in FIG. 1). As before, the M/G 14 can then be placed in generator torque control based on the needs of the battery or other electrical system needs. Mode 5 is ended and the engine start routine complete when the desired torque of the M/G 14 and the desired disconnect clutch pressure are attained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for starting an engine in a hybrid vehicle being driven by an electric machine, comprising:
   operating a starter motor;
   reducing a launch clutch pressure command to cause slip;
   raising a pressure command to a first clutch transferring torque to the engine when launch clutch slip has reached a predetermined level;
   turning off the starter motor;
   fueling the engine; and
   fully engaging the launch clutch after desired engine torque is achieved.

2. The method of claim 1, wherein the hybrid vehicle has at least one other clutch, disposed between the electric machine and vehicle drive wheels, selectively engageable to transfer torque between the electric machine and the drive wheels, the method further comprising facilitating slip in of the at least one other clutch during engagement of the first clutch when no downshift occurs during the engine start.

3. The method of claim 2, wherein the at least one other clutch includes a launch clutch and a plurality of transmission clutches, the method further comprising maintaining engagement of the launch clutch when the electric machine is supplying torque to move the vehicle and at least a portion of a downshift occurs during the engine start, thereby allowing a control of oncoming and offgoing transmission clutches during the downshift to effect slip between the electric machine and the vehicle drive wheels.

4. The method of claim 1, further comprising operating the electric machine using torque control when the electric machine is supplying torque to move the vehicle when the engine start is requested.

5. The method of claim 4, further comprising operating the electric machine using speed control after the starter motor is turned off.

6. The method of claim 1, wherein the step of operating the electric machine includes operating the electric machine using speed control when the electric machine is not supplying torque to move the vehicle when the engine start is requested.

7. The method of claim 1 further comprising fully engaging the first clutch when the speed of the engine approaches the speed of the electric machine.

8. The method of claim 1, wherein engine start is detected when engine speed exceeds starter motor speed by a given amount.

9. A method for starting an engine in a hybrid vehicle, comprising:
requesting an engine start when a first clutch disposed between the engine and an electric machine is at least substantially disengaged;
operating the electric machine;
initiating operation of a starter motor substantially simultaneously with
raising the pressure of the first clutch such that torque is transferred from the electric machine to the engine while the starter motor is still operating;
turning off the starter motor; and
fully engaging the first clutch.

10. The method of claim 9, the hybrid vehicle further having at least one other clutch disposed between the electric machine and vehicle drive wheels, the at least one other clutch being selectively engageable for facilitating torque transfer between the electric machine and the vehicle drive wheels, the method further comprising:
facilitating slip in one of the at least one other clutch; and
reducing the pressure of the first clutch from the first level to a stroke pressure before it is raised to the third level, the pressure of the first clutch being raised to the third level by raising the pressure from the stroke pressure by a first calibratable amount when a predetermined slip speed of the one of the at least one other clutch is detected.

11. The method of claim 10, wherein one of the at least one other clutch is a launch clutch, the method further comprising facilitating slip in the launch clutch during the engagement of the first clutch when the electric machine is supplying torque to move the vehicle and no downshift occurs during the engine start.

12. The method of claim 11, wherein the step of operating the electric machine includes operating the electric machine using torque control when the electric machine is supplying torque to move the vehicle when the engine start is requested, the method further comprising increasing torque output of the electric machine by a calibratable amount when a predetermined reduction in a slip speed of the launch clutch occurs.

13. The method of claim 9, the hybrid vehicle further having at least one other clutch disposed between the electric machine and vehicle drive wheels, the at least one other clutch including a plurality of transmission clutches selectively engageable for facilitating torque transfer between the electric machine and the vehicle drive wheels, the method further comprising controlling oncoming and offgoing transmission clutches during a downshift according to a predetermined shift schedule to effect slip between the electric machine and the vehicle drive wheels when at least a portion of the downshift occurs during the engine start.

14. The method of claim 13, further comprising:
determining an amount of slip between the electric machine and the vehicle drive wheels;
continuing to control the on-going and offgoing clutches according to the predetermined shift schedule if the determined slip is above a predetermined target slip; and
controlling the on-going and offgoing clutches through a closed loop control around the target slip if the determined slip is not above the predetermined target slip.

15. The method of claim 9, wherein the step of turning off the starter motor includes turning off the starter motor when a speed of the engine is a predetermined speed above a speed of the starter motor.

16. The method of claim 9, wherein the step of operating the electric machine includes operating the electric machine using torque control when the electric machine is supplying torque to move the vehicle when the engine start is requested.

17. The method of claim 9, wherein the step of operating the electric machine includes operating the electric machine using speed control when the electric machine is not supplying torque to move the vehicle when the engine start is requested.

18. A hybrid vehicle comprising:
an engine;
a starter motor for rotating the engine to facilitate an engine start;
an electric machine operable to propel the vehicle and to rotate the engine;
a first clutch disposed between and selectively connecting the engine to the electric machine; and
a control system including at least one controller, the control system being configured to:
request an engine start when the first clutch is at least substantially disengaged,
operate the electric machine,
initiate operation of the starter motor substantially simultaneously with the engagement of the first clutch, such that torque is transferred from the starter motor to the engine and required torque transfer from the electric machine to start the engine is reduced,
raise the pressure of the first clutch to transfer torque from the electric machine to the engine while the starter motor is still operating;
turn off the starter motor,
fuel the engine, and
fully engage the first clutch.

19. The hybrid vehicle of claim 18, further comprising a plurality of transmission clutches disposed between the electric machine and the vehicle drive wheels, the control system being further configured to control oncoming and offgoing transmission clutches during a downshift according to a predetermined shift schedule to effect slip between the electric machine and the vehicle drive wheels when at least a portion of the downshift occurs during the engine start.

20. The vehicle of claim 19, wherein the control system is further configured to:
control the on-going and offgoing clutches according to the predetermined shift schedule if the slip between the electric machine and the vehicle drive wheels is above a predetermined target slip, and
control the on-going and offgoing clutches through a closed loop control around the target slip if the slip between the electric machine and the vehicle drive wheels is not above the predetermined target slip.

* * * * *